March 10, 1964   F. W. KOEPKE, JR., ETAL   3,124,144
AUTOMATED WASHING OF MACHINE PARTS
Filed April 18, 1963   6 Sheets-Sheet 1

INVENTORS
FRED KOEPKE, JR.
NORMAN G. ZALEWSKI
BY
Curtis, Morris and Safford
ATTORNEYS March 10, 1964 F. W. KOEPKE, JR., ETAL 3,124,144
AUTOMATED WASHING OF MACHINE PARTS
Filed April 18, 1963 6 Sheets-Sheet 2

INVENTORS
FRED KOEPKE, JR.
NORMAN G. ZALEWSKI
BY
Curtis, Morris and Safford
ATTORNEYS

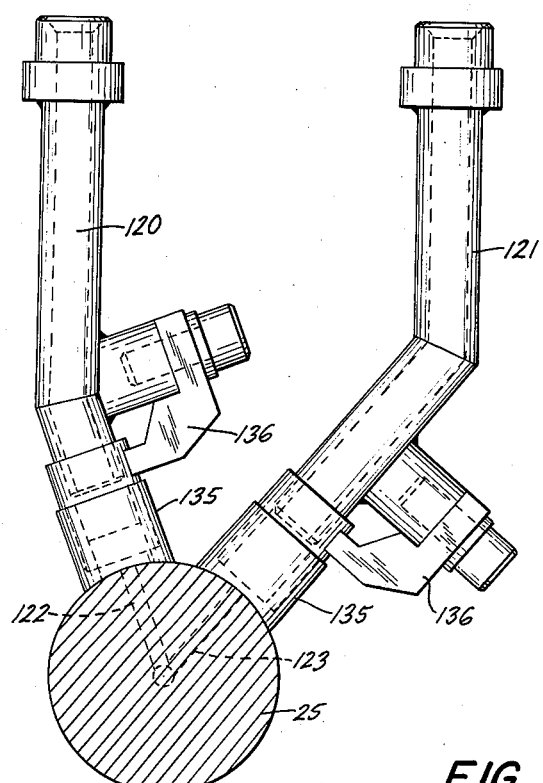
FIG. 4
FIG. 17
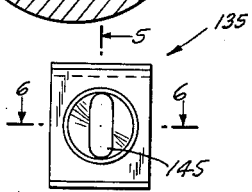
FIG. 7
FIG. 5
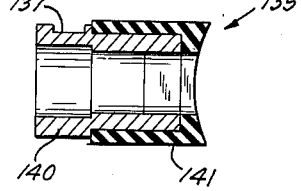
FIG. 6
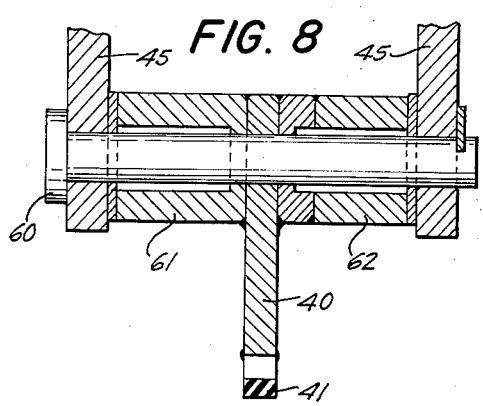
FIG. 8
INVENTORS
FRED KOEPKE, JR.
NORMAN G. ZALEWSKI
BY
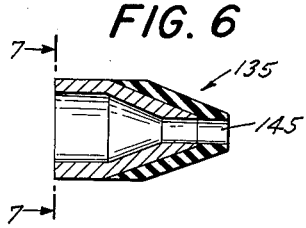
ATTORNEYS INVENTORS
FRED KOEPKE, JR.
NORMAN G. ZALEWSKI
BY
Curtis, Morris and Safford
ATTORNEYS March 10, 1964 F. W. KOEPKE, JR., ETAL 3,124,144
AUTOMATED WASHING OF MACHINE PARTS
Filed April 18, 1963 6 Sheets-Sheet 5

INVENTORS
FRED KOEPKE, JR.
NORMAN G. ZALEWSKI
BY
Curtis, Morris and Safford
ATTORNEYS March 10, 1964  F. W. KOEPKE, JR., ETAL  3,124,144
AUTOMATED WASHING OF MACHINE PARTS
Filed April 18, 1963  6 Sheets-Sheet 6

INVENTORS
FRED KOEPKE, JR.
NORMAN G. ZALEWSKI
BY
Curtis, Morris and Safford
ATTORNEYS

United States Patent Office 3,124,144
Patented Mar. 10, 1964

3,124,144
AUTOMATED WASHING OF MACHINE PARTS
Fred W. Koepke, Jr., Detroit, and Norman G. Zalewski, Garden City, Mich., assignors to Ajem Laboratories, Inc., Livonia, Mich.
Filed Apr. 18, 1963, Ser. No. 273,876
14 Claims. (Cl. 134—43)

This invention relates to the washing of various machine parts for the removal of oil, grinding and machining residues, lapping compounds, and the like prior to assembling the parts into the finished machine or assembly, and, more particularly, to substantially automated equipment and techniques for the jet washing of internal cavities and passages in such machine parts and for the automatic conveying and handling of the parts and positioning thereof in precise register with washing jets.

In the assembly of various machine parts into completed machines or devices, perhaps particularly in the automobile industry, the ultimate quality and performance of the assembled device may be importantly related to the completeness with which inevitably present soil is removed from various component parts prior to assembly. Thus, as a result of the particular manufacturing operations for the parts themselves, the finished part may be considerably soiled with cutting oil, polishing and lapping materials, various grinding grits, etc., as a result of whatever machining and finishing operations have been performed on the individual parts. Obviously, unless such highly abrasive soils are removed prior to the assembly of the individual parts into the highly complex assemblies in a modern automobile, the life of the individual parts and the quality of the final assemblies may be substantially and disastrously diminished.

Whereas modern automated or power washing techniques may satisfactorily accomplish the desired cleaning of the exterior surfaces of such machine parts, a substantially more complicated situation arises with regard to the flushing and washing of cavities or small borings or passages into the interior of the parts. For example, automobile engine blocks may include a number of tapped borings or cavities or blind holes in which a variety of machining residues and soils may readily collect during machining and finishing operations and in a manner which is not readily susceptible to removal in washing operations which may otherwise satisfactorily clean the readily exposed exterior surfaces of the block. Similarly, automotive crank shafts may include small lubrication passages leading into or through the various main bearing and crank pin portions for lubrication thereof in use, yet which passages readily become clogged during final machining or lapping of the polished bearing surfaces and to an extent which is both difficult to correct by conventional washing techniques and would be disastrous to the life of the crank shaft unless the passages were cleaned completely before assembly of the crankshaft into the finished device. As will be understood, of course, especially with mass produced parts such as automotive crankshafts and the like, automated techniques for accomplishing the necessary washing are desired, from the mass production standpoint, rather than having to depend upon hand washing and/or individual inspection and perhaps rewashing from the standpoint of commercial economics.

Considering particularly small diameter oil passages or similar borings or cavities (particularly blind cavities) as occur in such engine or machine parts as crank shafts and cylinder blocks, etc., it will be understood that the type of soil accumulating in such locations may not be readily removed merely by rinsing, and, indeed, may actually require individual jet washing impingement for adequate clearing of the small passages or dislodging soil from blind cavities. Yet, as will also be understood, the particular openings for such cavities or passages may be orientated on and over the various machine parts in a variety of different manners and, frequently, asymmetrically so as to complicate considerably arranging for directing washing jets into or at the particular small passages or cavities, and especially when the part being washed is itself of peculiar shape or otherwise configured so as to have a normal attitude of repose inconsistent with precise orientation with respect to washing jets.

According to this invention, however, there are provided systems and arrangements of apparatus, preferably substantially fully automated, for the automatic handling and conveying and transferring of various machine parts of the character described through one or more washing stations and for turning or orienting or indexing such parts so as to present openings or cavities or passages therein in register with washing jets for the cleaning thereof. As a further feature of this invention, there are also provided structures and arrangements for such washing jets and for moving them automatically into and out of engagement or register with variety of provisions for multi-stage washing with intermittent draining or rinsing or other cleaning operations, as well as providing for automatic handling of highly polished parts without danger of marring or otherwise damaging the finished or polished surfaces thereof.

With the foregoing and additional objects in mind, this invention will be described in more detail, and other objects and advantages thereof will be apparent from the following description, the accompanying drawings and the appended claims.

In the drawings:

FIG. 2 is a partial end view taken along the line 2—2 of FIG. 1;

FIG. 3 is a fragmentary view in more detail of part of the mechanism of FIG. 1 for positioning and holding a crank shaft, and taken along the line 3—3 of FIG. 1;

FIG. 4 is a detailed view on a somewhat larger scale of an arrangement of washing jet mandrels of the arrangement of FIG. 1 and shown as engaging oil passages in a main bearing of an automotive crankshaft;

Figure 1:
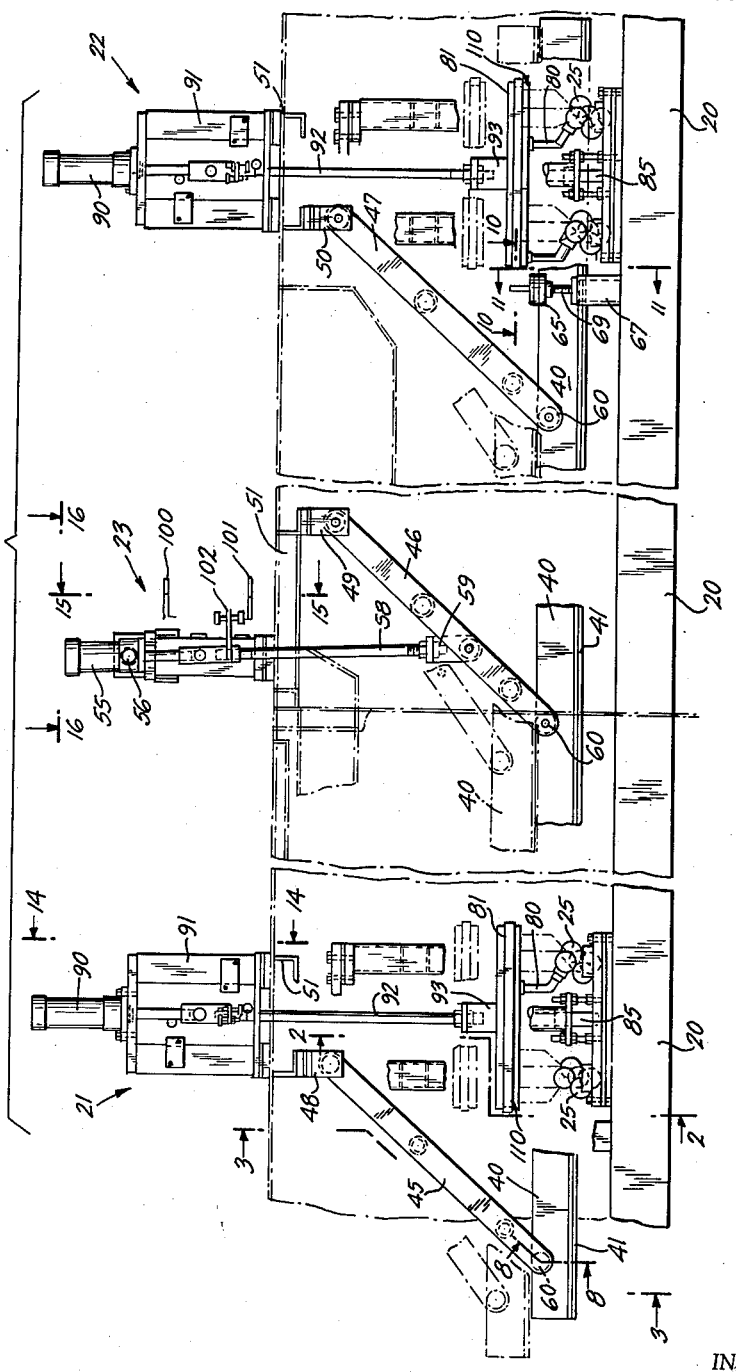
FIG. 1 is a somewhat diagrammatic side elevation showing, with some parts broken away for clarity, of an automated system and arrangement of apparatus embodying and for practicing this invention illustrated for handling automotive crank shafts.
Figure 9:
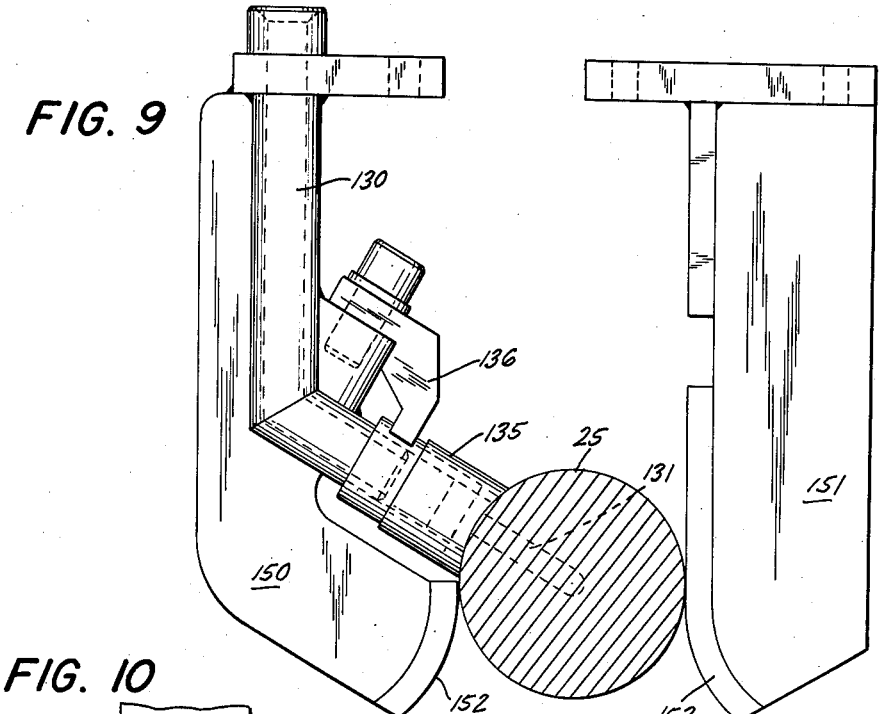
Figure 10:
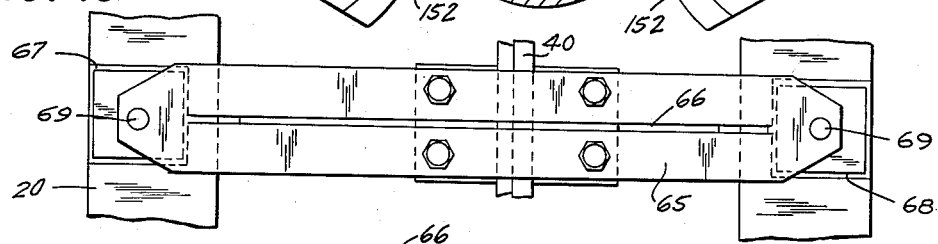
Figure 11:
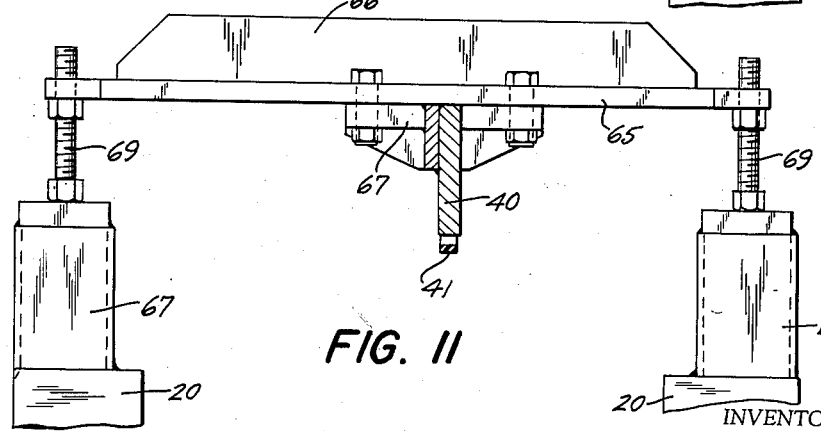
Figure 12:
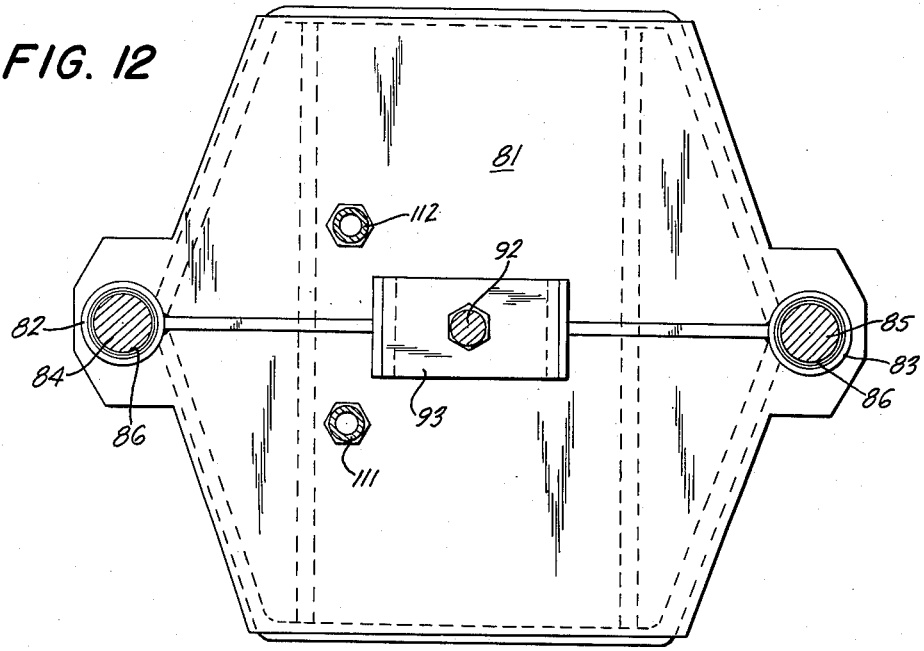
Figure 13:
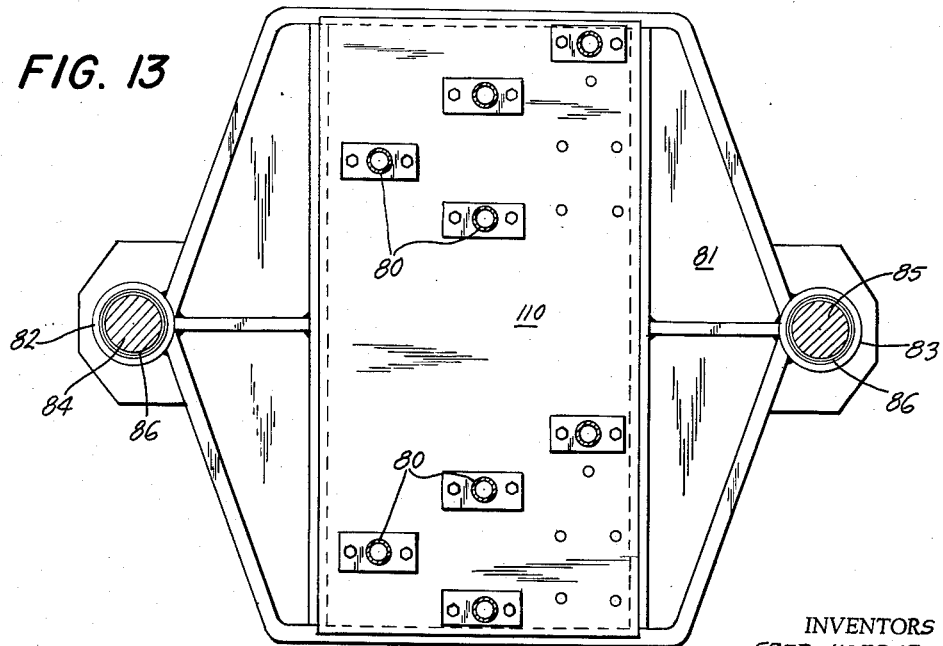
Figure 14:
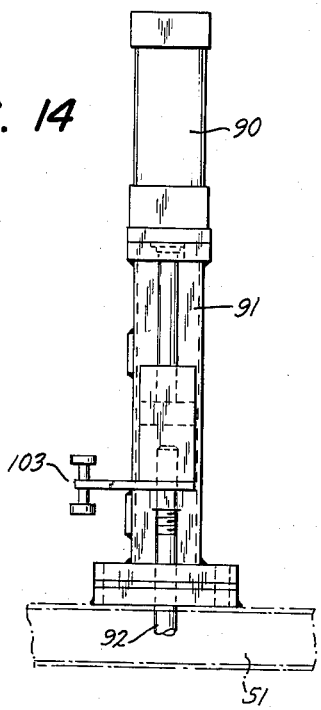
Figure 15:
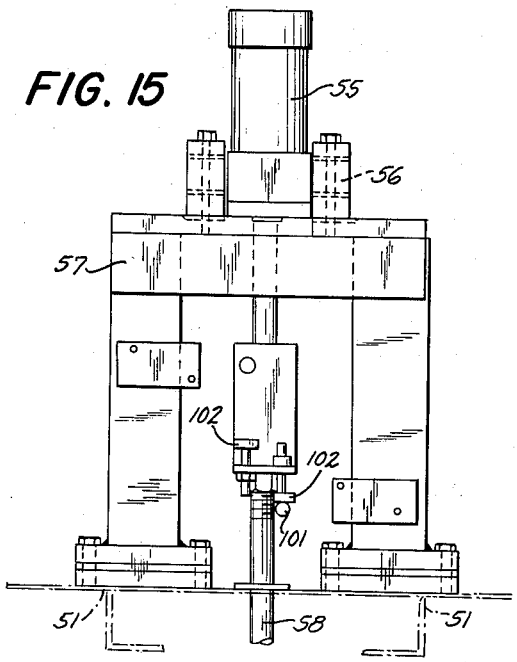
Figure 16:
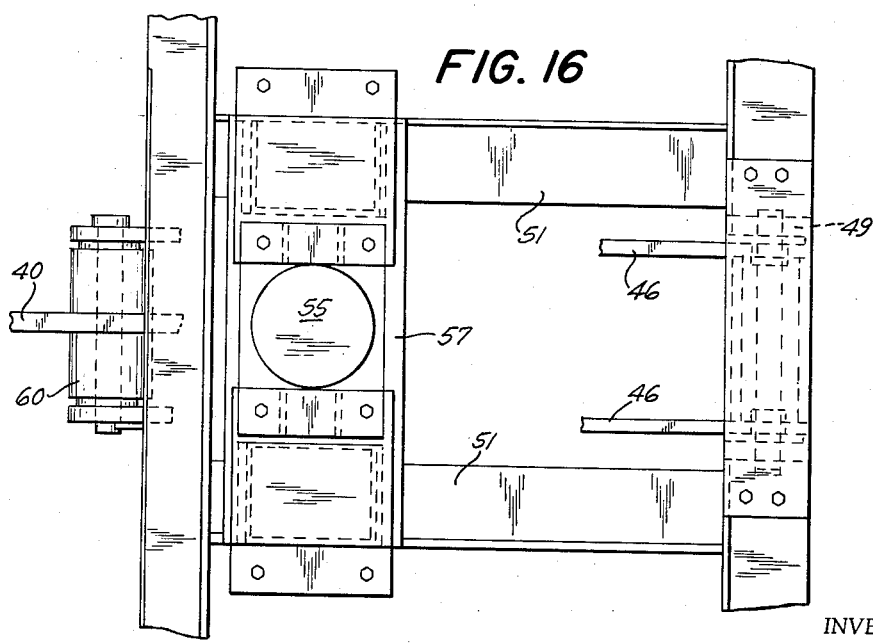

FIGS. 5-7 are, respectively, vertical and horizontal axial sections through the washing jet nozzles of FIG. 4 and a rear end elevation view thereof, each taken along the respectively designated line 5—5, 6—6, and 7—7 of FIGS. 6 and 7;

FIG. 8 is a detailed showing on a larger scale of a particular clevis structure operating linkage for the gross indexing and hold-down bar of the arrangement of FIG. 1;

FIG. 9 is a view similar to FIG. 4 and illustrating the registrating engagement of a washing jet with crank pin of automotive crankshaft, along with precise indexing means;

FIGS. 10 and 11 are, respectively, top and end elevation views of stop adjustment means for the gross indexing and hold-down means of the arrangement of FIG. 1 and taken, respectively, along the lines 10—10 and 11—11 thereof;

FIGS. 12 and 13 are, respectively, top and bottom views of one of the manifold and jet mandrel assemblies of the arrangement of FIG. 1 and taken, respectively, along the lines 12—12 and 13—13 of FIG. 2;

FIG. 14 is an end elevation detail of one of the jet-manifold actuating arrangements of FIG. 1 and taken along the line 14—14 thereof;

FIG. 15 is an end elevation detail of the gross indexing and hold-down bar actuating arrangement of FIG. 1 and taken along the line 15—15 thereof;

FIG. 16 is a fragmentary top view, with parts broken away, of the structure of FIG. 15 and as taken along the line 16—16 of FIG. 1; and FIG. 17 is a detailed view of a resilient stopper for utilization in lieu of a jet nozzle for closing one opening of an oil passage being washed in accordance herewith.

Referring to the drawings, in which like reference characters refer to like parts throughout the several views thereof, there is indicated generally in FIG. 1 an arrangement of apparatus embodying and for practicing this invention, as comprising a main longitudinally extending frame or bed 20 generally defining or supporting the arrangement. Two washer stations, indicated at 21 and 22, are shown along with their associated actuating apparatus, as well as actuating apparatus 23 for a gross indexing and hold-down bar described below. As will be understood, although there are shown only two washing stations 21 and 22, this arrangement may embody a sufficiently large plurality of such washing stations to accommodate whatever number of cavities or passages to be washed on each machine part as it is automatically fed sequentially through the apparatus from one washing station to the next as described below.

Merely for illustrative purposes, there is shown here automotive crankshafts as the parts being washed in the illustrated embodiment with the washing arrangements being indicated, as described in more detail below, as arranged for washing the various conventional lubricating oil passages for conducting lubricating oil through the crankshaft to lubricate various connecting rod and bearing connections engaging crankpins and main bearings of the crankshaft. Throughout the drawings, the crankshafts being conveyed and washed are indicated generally by numeral 25, with such indication being somewhat diagrammatically shown in FIG. 1.

The various crankshafts 25 are automatically and sequentially advanced from one station to another throughout the entire arrangement by any of a variety of conventional conveyor structures adapted to pick up a crankshaft at one station, advance it to the next station, and deposit it in the desired position. In the illustrated embodiment, the conveying mechanism is shown (particularly in FIG. 2) as being a hydraulic walking beam type of transfer mechanism (of the character disclosed in co-pending applications Ser. No. 50,138, filed August 17, 1960, and 218,358 filed August 21, 1952), one link of which is indicated generally at 30 and as having upstanding supports 31 and 32 for engaging concentric portions of crankshafts 25 as the walking beam 30 rises to pick-up the crankshaft and carry it forward to the next station.

A further member 33 is preferably provide on the transfer conveyor and laterally oriented thereon to engage an eccentric portion of crankshaft 25 (such as one of the crankpins thereof) to provide and maintain a certain gross angular or rotational orientation of the crankshafts during the transfer thereof to each succeeding station, in known manner. At the various stations (only one of which is shown in FIG. 2) the crankshafts 25 are generally supported at the ends thereof on stationary supports 35 and 36, with the crankshafts 25 being supported at concentric end portions thereof permitting rotation of the crankshaft as it rests on supports 35 and 36 to achieve the final and fine angular indexing described below so that whatever passages or cavities are to be washed will be precisely angularly oriented with respect to the washing jets or other mechanism at each succeeding station.

In washing apparatus of the character described, especially where pressure jets impinge upon the part being washed and where precise orientation of the part with respect to the jets is desired, a number of important considerations occur at the various jet washing stations. For example, with the high pressures of washing fluids hitting the parts, they should be held firmly in place at each station to prevent disloging or misalignment, yet such hold down means must cooperate with (or at least not interfere with) the jet washing mechanism, and whatever mechanism is provided for achieving the final precise orientation of the part with respect to the washing jets. Furthermore, especially with machine parts such as crankshafts having critically highly polished bearing and crankpin surfaces such hold-down mechanism should avoid any scratching or marring of the finished surfaces.

Also, especially when the passages to be washed are oil holes or lubrication passages in the polished bearing surfaces at different angular positions with respect to the axis of the part and/or arranged at different positions on or around eccentric portions of the crankshaft, a particular and precise angular indexing of the crankshaft should be achieved in order to present the various differently located oil holes in the proper and precise position to be engaged by the jet washing mechanism.

The foregoing various considerations are satisfactorily accommodated in accordance herewith by a hold-down beam 40 and more precise or fine indexing means indicated in FIG. 9 and discussed in more detail below. Hold-down beam 40 is provided, as will be apparent, not only to hold the crankshaft 25 at the various stations against dislodging, but also to provide an initial or gross indexing supplementing the angular orientation of the walking beam conveyor. That is, hold-down beam 40 is adapted to be raised and lowered (as indicated by the full line and dot-dash line showings of FIG. 1) intermittently and automatically, as precisely coordinated and synchronized with the other mechanisms, so that beam 40 is raised as a transfer mechanism picks up the crankshafts and transfers them sequentially to the next station, at which time beam 40 is lowered into holding position.

As indicated particularly in FIG. 2, beam 40 is laterally positioned with respect to the particular crankshaft being treated and the particular angular orientation thereof desired at each of the various stations, so that the lower edge of beam 40 engages a predetermined eccentric portion of the crankshaft (such as one of the eccentric crankpins as illustrated in FIG. 2) and pushes such eccentric portion downwardly to rotate the crankshaft in its supports 35 and 36 to the desired angular position. As will be understood, the selection of the particular eccentric portion along crankshaft 25 to be contacted by beam 40 permits achieving any of a variety of rotated positionings of the crankshaft, while also providing for holding the crankshaft in supports 35 and 36 against inadvertent dislodgement thereof. As illustrated, the lower edge of hold-down beam 40 is preferably provided with a resilient or cushioning plastic edge 41 for actual contact with the crankshaft so as to avoid marring or scratching a polished or finished surface thereof such as one of the crankpins or bearings.

Hold-down beam 40 is supported by a plurality of support arms 45–47, depending from and pivotally connected to brackets 48–50 mounted on top frame members 51 of the arrangement, and preferably with the several support arms 45–47 being balanced at the several raised and lowered positions of beam 40 to achieve a symmetrical and uniform support of beam 40 throughout the upward and downward motion thereof and along the total length of beam 40 and the support arms.

Movement of beam 40 is actuated by the arrangement indicated at 23 and including a hydraulic cylinder 55 pivotally supported at 56 on a supporting structure indicated generally at 57 and mounted on top frame member 51. The action of cylinder 55 is imparted to support arm 46 as by a connecting rod 58, while the pivot 56 permits a swinging or pendulating motion of connecting rod 58 to impart through support arm 46 the desired upward and downward motion to hold-down beam 40 as indicated in the solid and dot-dash line showings of FIG. 1. It will be noted that the relative elevation for the stroke of cylinder 55 may be governed substantially by the relative positioning of the clevis 59 on support arm 46, with satisfactory results being obtained by placing this clevis connection within the range of about ½ of the distance between the upper pivot point of support arm 46 at 49 to the pin 60 engaging hold-down beam 40, thus giving latitude in application and operation of hold-down beam 40 upwardly and downwardly to clear crankshafts 25 while they are being raised and transferred to the next station and yet to engage a lower eccentric portion of the crankshafts at each station and maintain them in position against dislodgement. As indicated in more detail in FIGS. 3 and 16, the various support arms 45–47 are preferably formed of rather widely spaced bars to enhance rigidity and reproducibility in the up and down motion without side thrust. As noted in FIG. 8, engaging pin 60 preferably extends through spacing bushings 61 and 62, and preferably engages hold-down bar 40 through an oversize or elongated opening (not shown) for maximum versatility.

At a plurality of points along hold-down beam 40 (preferably, at each end) there is affixed thereto a cross member extending across the apparatus and indicated in more detail in FIGS. 10 and 11, and with the location of one such arrangement being shown as illustrative near the righthand end of FIG. 1. Thus, a cross member 65, preferably provided with a rigidifying web 66 is affixed to hold-down beam 40 as by brackets 67, with the cross piece 65 extending completely across the apparatus. Upstanding rests 67 and 68 are mounted on side frame members 20 beneath the opposite ends of cross member 65, while adjustable bolts 69 form stops limiting the downward motion of hold-down beam 40 as bolts 69 engage rests 67 and 68.

In this manner, hold-down beam 40 is lowered with no tortion or side thrust or twist, as it engages the part to be washed. Furthermore, the lower limit of travel is adjustable, through bolts 69, so that hold-down beam 40 and plastic edge 41 thereof smoothly engage an eccentric portion of crankshaft 25 during lowering of beam 40 so as to rotate or index the crankshaft, yet the lower limit of travel of beam 40 can be adjusted just short of actual pressure against the crankshaft during washing and/or while the crankshaft is being finely indexed and engaged by the precise indexing means described below and indicated in FIG. 9. As will be understood from the foregoing, a plurality of parallelly operating hold-down beams 40 may be arranged across the apparatus, depending upon the size and shape of the particular part being washed, and the operation and positioning thereof is readily coordinated for the same or different sequences and extents of motions to accommodate the particular holding and indexing functions in accordance herewith as may be required by a wide variety of differently shaped parts, although only one hold-down beam is illustrated in the drawings for simplicity and clarity.

As noted above, with the individual crankshafts 25 (or any other part to be treated) located at the various stations and held in position by beam 40, etc., a plurality of washing jets is brought into direct contact with the particular passages or cavities to be washed at the various washing stations. As will be understood, the final and precise construction and configuration of such jets will depend largely on the number and size and location of the particles to be washed, as well as upon whether washing liquid, rinsing liquid, and/or air is to be ejected from each jet, selectively or simultaneously or intermittently as the case may be. Nevertheless, in accordance herewith, regardless of the final configuration or positioning of each individual jet at each station, vertically ascending and descending manifold and actuating apparatus is provided for the several stations to carry into and out of engagement with the part being treated whatever washing or rinsing or drying jets may be desired at that particular station.

Thus, two such manifold actuating mechanisms generally indicated at 21 and 22 are illustrated for accommodating the various jets at four washing stations. For clarity of illustration, only a few individual jets are shown in FIG. 1 and all schematically indicated at 80, while FIGS. 4 and 9 illustrate several individual jet structures in actual engagement with a portion of a crankshaft 25. Whatever may be the specific orientation of jets 80, they are all carried as depending from one or more manifold plates 81, indicated in FIGS. 1 and 2 and in more detail in FIGS. 12 and 13. Plate 81 is mounted between hollow guide sleeves 82 and 83 around guide rods 84 and 85. Within guide sleeves 82 and 83 are close tolerance guide bushings 86 for sliding movement with respect to guide rods 84 and 85 to maintain precise uniform vertical alignment throughout ascending and descending movements of manifold plate 81 as guide sleeves 82, 83 and guide bushings 86 slide up and down guide rods 84, which are in turn stationarily mounted on main frame 20. Such upward and downward movement of manifold plate 81 is provided by hydraulic cylinder 90, mounted upon supporting structure indicated at 91 on top frame members 51, with the motion of hydraulic cylinder 90 being imparted to guide plate 81 as by connecting rod 92 affixed to plate 81 by a bracket 93.

Since the foregoing mechanism for the station indicated at 22 at FIG. 1 is substantially the same as that described for the station indicated at 21, the same reference numerals have been applied to both mechanisms. Preferably, also, the lower end of guide sleeves 82, 83 are provided with a plate 95 including an adjustable bolt 96 forming an adjustable stop for limiting the lower limit of travel of manifold plate 81 toward crankshaft 25 to be treated. In this manner, the sequential and coordinated actuation of cylinder 55 and cylinders 90 and the walking beam transfer mechanism 30 automatically produces the desired sequence of operations whereby (a) the crankshafts 25 are transferred to appropriate washing stations and deposited thereat by the transfer mechanism, (b) hold-down beam 40 descends to index the crankshafts angularly, (c) manifold plates 81 descend to bring the various jets 80 into engagement with the appropriate cavities or passages to be washed on the crankshaft at the various stations, (d) the manifold plates 81 then retract upwardly after a predetermined and timed washing interval, (e) hold-down beam 40 then retracts upwardly to clear the crankshafts 25, and (f) finally the walking beam transfer mechanism 30 picks up each crankshaft and moves it to the next successive position.

The sequencing and timing of the foregoing arrangement, as will be understood, is produced by well known timing and limit switch mechanisms, but as indicative thereof, two limit switches 100 and 101 are diagrammatically indicated for actuation by adjustable actuators indicated at 102 as defining extreme opposite limits of cylinder 55 in the operation of hold-down beam 40, while similar actuators 103 are indicated as affixed to connecting rods 92 of cylinders 90 for operation in conventional manner and as associated with timing mechanism (not shown) defining and adjusting the various dwell times of the various mechanical movements as well as the timing actual ejection of washing liquid or air through the various jets 80 as they engage the cranckshafts 25 to be washed.

Affixed to the underside of each manifold plate 81 is a washing manifold designated 110 (FIGS. 2 and 13) which carries the various jets 80 in whatever particular configuration is desired for that particular washing station. Internal passages through manifolds 110 supply air or water or other desired washing or rinsing or treating fluid to the individual jets as through supply conduits 111 and 112, and flexible tubing 113 leading thereto, as will be understood in known manner.

Referring now more particularly to FIGS. 4–7, 9, and 17, there is indicated in somewhat more detail the constructions of particular jets and jet nozzles and fine indexing mechanisms. Thus, in FIG. 4 are shown two jets 120 and 121 illustratively oriented as, for example, to engage and accommodate internal lubrication channels 122 and 123 in a concentric portion or bearing of a crankshaft 25, while there is indicated in FIG. 9 a jet 130 for accommodating an internal passage 131 in an eccentric or crankpin portion of crankshaft 25. As will be understood, all of the jets 120, 121, and 130, as well as any others of a different configuration required for different portions of the part being treated, are carried and supplied by one of the manifolds 110 on one of the manifold plates 81 as they ascend and descend into and out of engagement with the designated portions of the crankshaft 25.

Also as indicated in both FIGS. 4 and 9, each of the jets culminates in a removable tip or nozzle 135 as indicated in FIGS. 5–7, which tips are held in place as by clamps 136 engaging a slot 137 in each of the tips 135. As noted in FIGS. 5–7, the nozzles or tips include a metal portion 140 and an outer covering of soft resilient plastic adapted to avoid marring or scratching the polished surfaces of the part being treated and also sufficiently resilient to permit actual tight compressive engagement between the tip and the surface of the part 25 adjacent the particular passages to be cleaned for direct injection of washing liquid and/or air into the passages 122, 123, 131, etc. Preferably, also, the outlet orifice 145 in the various tips 135 is elongated or oblong in a circumferential direction of the part being treated to accommodate possible slight imprecisions of indexing, while also permitting substantial sealing of resilient covering 141 against the surface of the part being treated, particularly when that surface is cylindrical as in the illustrated crankshaft 25. In instances where it may be desired to close one end of a passage while washing fluid is injected into some other portion thereof, a blind or closed tip 148 (FIG. 17) may be affixed to one of the jets or similar structures for engaging a passage or cavity in the same manner as with a liquid jet having an orificed tip 135.

Referring more particularly to FIG. 9 as illustrating a jet 130 engaging an eccentric crankpin portion of a crankshaft 25, a preferred example of the final and fine indexing mechanism is illustrated as including two depending guides or locator members 150 and 151, both of which depend from and are carried by a manifold 110 and/or manifold plate 81. A resilient plastic coating or edge covering 152 is indicated for the contacting edges of locators 150 and 151 so as to avoid marring of the polished surface of the crankshaft while the final indexing thereof is accomplished. Thus, considering that an eccentric crankpin of crankshaft 25 is shown in section in FIG. 9, a certain preliminary angular indexing has been given to crankshaft 25 by hold-down beam 40 as above described and prior to the time when jet 130 and locators 150, 151 descend into engagement with the eccentric crankpin portion. Any slight angular misalignment of the crankshaft, accordingly is corrected as the two locators 150 and 151 descend into engagement with and around the eccentric crankpin, moving that particular pin precisely to an angular position (around the main axis of the crankshaft) between locators 150 and 151 which presents passage 131 in that crankpin in a position to be engaged directly by jet nozzle 130. Such adjustment of but one eccentric crankpin at each station, as will be understood, provides simultaneous angular adjustment of the entire crankshaft around the axis thereof and, consequently, of all cavities or passages to be washed with respect to all jets coming into engagement at that particular station. Thus, the configuration of locators 150 and 151 indicated in FIG. 9 is purely illustrative since the precise arrangement and shape of such locators are especially tailored for each washing station and with regard to each particular kind or model of crankshaft being washed so as to orient in the manner desired the various passages with respect to various jets in each instance.

There is, thus, provided in accordance herewith automatic and integrated apparatus for transferring machine parts having internal passages or cavieies to be cleaned through a plurality of sequential cleaning steps for the application at each station of cleaning, washing, rinsing and/or drying jets and including means for orienting or re-orienting the part to be treated at each successive station so that the particular cavity or passage therein are spatially arranged so that one or more jet nozzles will precisely contact the cavity or passage for the application thereto of whatever treatment is desired at each respective station.

As will be understood, in view of the fact that such jet nozzle means are retractable away from each station to permit removal and transfer of the parts from one station to the next, the apparatus includes both gross and fine indexing means for such precise alignment of the parts at each station and, in the illustrated embodiment, such indexing means are particularly adapted for the proper orienting of parts which are in one way or another rotatable about a support axis, while also including, as a part of the gross indexing means, hold-down means for maintaining the parts in the desired orientation at each station and against the action of impingement of jet streams of liquids or drying air against the part.

While the forms of apparatus and the techniques herein disclosed form preferred embodiments of this invention, this invention is not limited to those precise forms of apparatus and techniques, and modifications thereof may be made without departing from the scope of this invention which is defined in the appended claims.

What is claimed is:

1. In apparatus of the character described for the automatic power cleaning of internal cavities and passages of machine parts prior to the final assembly thereof by sequential treatment of said cavities and passages at a plurality of washing and rinsing and drying stations along said apparatus, the combination which comprises transfer means for transferring said parts sequentially from one of said stations to another, support means at each said station for supporting one of said parts thereat to receive a cleaning operation, gross indexing means at each said station for approximately indexing said parts spatially to position said cavities and passages therein for receiving said cleaning treatment at said station and including vertically reciprocal hold-down means for contacting an offset portion of said parts and depressing said portion for effecting said gross indexing of said cavities and passages to be treated, jet manifold means including a pressure jet nozzle for each of said cavities and passages to be cleaned at said station, means for reciprocating said jet manifold means from a retracted position spaced from said parts during transfer and indexing thereof to a working position in which each of said jet nozzles directly contacts a different one of said cavities and passages to be treated, fine indexing means for contacting and positioning said part at said station for the fine indexing and angular positioning thereof to bring each of said cavities and passages into flow alignment with one of said jet nozzles, means for supplying cleaning and treating fluid through said jet nozzles in said jet manifold when each of said nozzles is in flow contact with a cavity or passage in said part to be treated, and automatic timing and sequencing means for controlling the sequential operation of all said transfer and hold-down and gross indexing and fine indexing and jet manifold and fluid supplying means for effecting said sequence of operations on each said machine part to be cleaned at each of said sequential cleaning stations.

2. In apparatus of the character described for the automatic power cleaning of internal cavities and passages of machine parts prior to the final assembly thereof by sequential treatment of said cavities and passages at a plurality of washing and rinsing and drying stations along said apparatus, spatial indexing of said parts at each said station, the combination which comprises transfer means for transferring said parts sequentially from one of said stations to another, support means at each said station for supporting a part therewith to receive a cleaning operation, indexing means at each said station for approximately indexing said parts spatially and angularly on said support means at each said station to position said cavities and passages in said parts for receiving said cleaning treatment and including vertically reciprocal hold-down means for contacting an offset portion of said parts and depressing said portion for effecting said gross indexing, vertically reciprocal jet manifold means including a pressure jet nozzle for each of said cavities and passages to be cleaned at said station, means for vertically reciprocating said jet manifold from a retracted position above said parts during transfer and indexing to a lowered position in which each of said jet nozzles directly contacts a different one of said cavities and passages, fine indexing means for contacting and positioning said part at said station for the fine indexing and angular positioning thereof to bring each of said cavities and passages into flow alignment with one of said jet nozzles, and means for supplying cleaning and treating fluid through said jet nozzles in said jet manifold when each of said nozzles is in flow contact with a cavity or passage in said part to be treated.

3. In apparatus of the character described for the automatic power cleaning of internal cavities and passages of machine parts prior to the final assembly thereof by sequential treatment of said cavities and passages at a plurality of washing and rinsing and drying stations along said apparatus, the combination which comprises transfer means for transferring said parts sequentially from one of said stations to another, support means at each said station for supporting one of said parts thereat to receive a cleaning operation, hold-down means at each said station for contacting an off-set portion of said part and depressing said portion for positioning of said parts with said cavities and passages in position to be treated, jet manifold means including a pressure jet nozzle for each of said cavities and passages to be cleaned at said station, means for moving said jet manifold from a retracted position spaced from said parts during transfer and indexing thereof to a working position in which each of said jet nozzles directly contacts a different one of said cavities and passages, indexing means for contacting and positioning said parts at said station for indexing and angular positioning thereof to bring each of said cavities and passages into flow alignment with one of said jet nozzles, and means for supplying cleaning and treating fluid through said jet nozzles in said jet manifold when each of said nozzles is in flow contact with a cavity or passage in said part to be treated.

4. Apparatus as recited in claim 3 in which said jet manifold means is vertically reciprocated by a power cylinder mounted above said stations and in which said plurality of jet nozzles on said jet manifold means is oriented and disposed thereon providing a plurality of differently oriented jet nozzles at each said station adapted directly to contact said cavities and passages in said part, and said jet manifold means also including said indexing means for final spatial orientation of said parts at each said station to bring said cavities and passages to be cleaned therein into flow alignment with said plurality of jet nozzles on said jet manifold.

5. Apparatus as recited in claim 4 which also includes frame support means parallel to and vertically spaced from the line of travel of said parts through said station for supporting said power cylinder means and said hold-down means for said vertical reciprocation thereof, and stop means for defining the lower limit of travel of said hold-down means.

6. In apparatus of the character described for the automatic power cleaning of internal cavities and passages of machine parts prior to the final assembly thereof by sequential treatment of said cavities and passages at a plurality of washing and rinsing and drying stations along said apparatus, said parts having a principal longitudinal axis and offset eccentric portions whereby said parts assume under the force of gravity a particular angular position of repose with respect to said axis when supported at said axis, the combination which comprises transfer means for transferring said parts sequentially from one of said stations to another, support means at each said stations for supporting of said parts thereat to receive a cleaning operation, a substantially horizontal and vertically reciprocal hold-down bar extending through a plurality of said stations and disposed in said apparatus to contact one of said offset eccentric portions of said parts at said stations for depressing said offset eccentric portion to provide gross angular indexing of said parts for the spatial orientation thereof to position said cavities and passages therein for receiving said cleaning treatment at each said station, power cylinder means for vertically reciprocating said hold-down bar from a retracted position above and out of contact with said parts during said transfer thereof to a working position engaging said offset eccentric portion of said parts for holding said parts on said support means against dislodging movement during said cleaning treatment at each said station, said power cylinder means being mounted on said apparatus vertically spaced above said stations, and linkage means for operatively connecting said hold-down bar with said power cylinder means at a plurality of points therealong for effecting said vertical reciprocating movement of said bar.

7. Apparatus as recited in claim 6 in which said hold-down bar includes a resilient layer at the bottom edge thereof for contacting said parts without marring of finished surfaces thereof.

8. In apparatus of the character described for the automatic power cleaning of internal cavities and passages of machine parts prior to the final assembly thereof by sequential treatment of said cavities and passages at a plurality of washing and rinsing and drying stations along said apparatus, the combination which comprises transfer means for transferring said parts sequentially from one of said stations to another, support means at each said station for supporting one of said parts thereat to receive a cleaning operation, gross indexing means at each said station and operating in association with said support means for approximately indexing said parts spatially and angularly to position said cavities and passages therein for receiving said cleaning treatment and including vertically reciprocal hold-down means for contacting an offset portion of said parts and depressing said portion for effecting said gross indexing and angular positioning of said cavities and passages to be treated, jet manifold means including a pressure jet nozzle for each of said cavities and passages to be cleaned at said station, means for vertically reciprocating said jet manifold means from a retracted position above said part during transfer and indexing thereof to a lowered position in which each of said jet nozzles directly contacts a different one of said cavities and passages to be treated, fine indexing means associated with said jet manifold and reciprocal therewith for contacting and positioning said parts for the fine indexing and angular positioning thereof to bring each of said cavities and passages into flow alignment with one of said jet nozzles, and means for supplying cleaning and treating fluid through said jet nozzles in said jet manifold when each of said nozzles is in flow contact with a cavity or passage in said part to be treated.

9. Apparatus as recited in claim 8 which also includes resilient surfaces on those parts of said hold-down bar and said jet nozzles which come into direct contact with working or polished surfaces of said parts being cleaned for avoiding marring of said working surfaces while said parts are transferred through said apparatus.

10. In apparatus of the character described for the automatic power cleaning of internal cavities and passages of machine parts prior to the final assembly thereof by sequential treatment of said cavities and passages at a plurality of washing and rinsing and drying stations along said apparatus, said parts having a principal longitudinal axis and offset eccentric portions whereby said parts assume under the force of gravity a particular angular position of repose with respect to said axis when supported at said axis, the combination which comprises transfer means for transferring said parts sequentially from one of said stations to another, support means at each of said stations for supporting of said parts thereat to receive a cleaning operation, a substantially horizontal and vertically reciprocal hold-down bar extending through a plurality of said stations and disposed in said apparatus to contact one of said offset eccentric portions of said parts at said stations for depressing said offset eccentric portion to provide gross angular indexing of said parts for the approximate spatial orientation thereof to position said cavities and passages therein for receiving said cleaning treatment at each said station, power cylinder means for vertically reciprocating said hold-down bar from a retracted position above and out of contact with said parts during said transfer thereof to a working position engaging said offset eccentric portion of said parts for holding said parts on said support means against dislodging movement during said cleaning treatment at each said station, said power cylinder means being mounted on said apparatus vertically spaced above said stations, linkage means for operatively connecting said hold-down bar with said power cylinder means at a plurality of points therealong for effecting said vertical reciprocating movement of said bar, vertically reciprocating jet manifold means including jet nozzles for each of said cavities and passages to be cleaned, and means for moving said jet manifold means into contact with said indexed parts with each jet in flow alignment with a cavity or passage to be cleaned.

11. An apparatus as recited in claim 10 in which said manifold means has suspended therefrom abutments for said fine indexing of said parts to be cleaned for exact alignment of said jets with the opening of the cavities of said parts.

12. An apparatus as recited in claim 10 in which said holding and positioning means includes a double barred lever one bar of said lever on each side of and suspended substantially vertically of said frames said bars having braces therebetween, the upper end of said lever being pivoted on the said upper frame and the lower end thereof being pivoted on the center of said hold-down beam, a substantially vertical support arm pivoted at the top thereof on said power cylinder means and pivoted at the bottom thereof on said lever at a point thereon substantially in the center between the two ends thereof, said lever and said support arm providing support for said hold-down beam while prohibiting torsional thrust thereof, and a resilient layer on the bottom edge of said hold-down beam for protecting the parts to be engaged from marring or scratching.

13. An apparatus as recited in claim 10 in which said manifold means includes substantially vertical guide rods at each side thereof, a plate suspended between said guide rods with sleeves thereon for sliding engagement with said guide rods, said manifold means being attached to the bottom of said plate, and a vertical connecting rod the upper end connected to power cylinder means and the lower end connected to said plate for raising and lowering said plate with said manifold means along said guide rods.

14. An apparatus as recited in claim 10 in which said jets have attached thereto guiding edges for engaging said parts to be washed and indexing them to the extent necessary to bring said jets into exact flow alignment with said cavities and passages in said parts, and resilient pieces on said guiding edges in the areas where they abut said parts for protecting the surfaces of said parts from marring or scratching.

References Cited in the file of this patent
UNITED STATES PATENTS

| | | |
|---|---|---|
| 1,942,538 | Cutler | Jan. 9, 1934 |
| 2,634,734 | Barrett | Apr. 14, 1953 |